US012755237B2

United States Patent

(12) United States Patent
Sohlberg et al.

(10) Patent No.: US 12,755,237 B2
(45) Date of Patent: Oct. 6, 2026

(54) METHOD AND CONTROL UNIT FOR MANAGING LOADING AND/OR OFFLOADING OF A VEHICLE

(71) Applicant: VOLVO TRUCK CORPORATION, Gothenburg (SE)

(72) Inventors: Per Sohlberg, Hovås (SE); Stefan Pettersson, Eskilstuna (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 208 days.

(21) Appl. No.: 18/472,437

(22) Filed: Sep. 22, 2023

(65) Prior Publication Data

US 2024/0104497 A1 Mar. 28, 2024

(30) Foreign Application Priority Data

Sep. 23, 2022 (EP) .................................... 22197373

(51) Int. Cl.
*G06Q 10/08* (2024.01)
*B65G 67/00* (2006.01)
*G06Q 10/0639* (2023.01)
*G06Q 10/087* (2023.01)

(52) U.S. Cl.
CPC ........... *G06Q 10/087* (2013.01); *B65G 67/00* (2013.01); *G06Q 10/0639* (2013.01)

(58) Field of Classification Search
CPC .. G06Q 10/087; G06Q 10/0639; G06Q 10/08; B65G 1/137; B65G 67/04; B65G 67/00
See application file for complete search history.

(56) References Cited

U.S. PATENT DOCUMENTS 10,467,581 B2 * 11/2019 Laury .................. G01C 21/343
10,553,122 B1 * 2/2020 Gilboa-Amir ..... G06Q 10/0832
10,630,628 B2 * 4/2020 Orsini ................ G01C 21/3407
10,822,170 B2 * 11/2020 Hance ..................... G05D 1/021
10,885,490 B2 * 1/2021 Mains, Jr. ............ G06Q 10/083
11,030,570 B2 * 6/2021 Raut ....................... G08G 1/202
11,062,405 B2 * 7/2021 Nagata ................. G06Q 20/202
11,074,540 B2 * 7/2021 Sweeney ................ B64U 70/90
(Continued)

OTHER PUBLICATIONS

Extended European Search Report in corresponding European Application No. 22197373.8 dated Feb. 27, 2023 (8 pages).

*Primary Examiner* — Florian M Zeender
*Assistant Examiner* — Milena Racic
(74) *Attorney, Agent, or Firm* — Jeffri A. Kaminski; Venable LLP

(57) ABSTRACT

A control unit manage loading and/or offloading of a vehicle. The control unit obtains information indicating one or more of: which vehicle that is to be loaded and/or offloaded, a target time for vehicle departure and a vehicle capacity. The control unit initiates loading and/or offloading of goods using assets. The control unit receives real-time information about an amount of goods that has been loaded and/or offloaded to and/or from the assets. The control unit determines, based on the real-time information, that the loading and/or offloading of the vehicle will be finished before, at or after the target time for vehicle departure. The control unit provides information indicating that the loading and/or offloading will be finished before or after the target time.

10 Claims, 5 Drawing Sheets

(56) References Cited

U.S. PATENT DOCUMENTS

| | | | | |
|---|---|---|---|---|
| 11,099,560 | B2 * | 8/2021 | Smith | B60W 60/0025 |
| 11,126,957 | B2 * | 9/2021 | Appel | G06Q 10/087 |
| 11,248,912 | B2 * | 2/2022 | Mitra | G01C 21/3423 |
| 11,282,383 | B1 * | 3/2022 | Libin | G06N 20/00 |
| 11,438,938 | B1 * | 9/2022 | Kennedy | H04W 12/08 |
| 11,455,594 | B2 * | 9/2022 | Helvie | G06Q 20/12 |
| 11,466,997 | B1 * | 10/2022 | Williams | G08G 1/096716 |
| 11,466,998 | B1 * | 10/2022 | Williams | G06Q 10/0635 |
| 11,488,100 | B2 * | 11/2022 | Helvie | G06Q 10/0832 |
| 11,503,655 | B2 * | 11/2022 | Kennedy | H04W 4/40 |
| D973,078 | S * | 12/2022 | Hou | G06Q 10/083<br>D14/485 |
| 11,528,759 | B1 * | 12/2022 | Kennedy | H04L 67/10 |
| 11,551,554 | B2 * | 1/2023 | Woodrow | G08G 7/00 |
| 11,641,678 | B2 * | 5/2023 | Kopchinsky | H04W 4/40<br>370/219 |
| 11,691,467 | B2 * | 7/2023 | Dodd | B60D 1/36<br>701/23 |
| 11,748,700 | B2 * | 9/2023 | Jacobus | G05D 1/0234<br>700/215 |
| 11,756,428 | B2 * | 9/2023 | Ranjan | G08G 1/096844<br>701/410 |
| 11,760,383 | B2 * | 9/2023 | Hara | G16H 20/13<br>701/25 |
| 11,775,892 | B2 * | 10/2023 | Mains, Jr. | G06Q 10/083<br>705/7.13 |
| 11,790,307 | B2 * | 10/2023 | Dogishi | G06Q 10/0832<br>701/23 |
| 11,922,361 | B2 * | 3/2024 | Kawaguchi | G06Q 10/083 |
| 11,928,608 | B2 * | 3/2024 | Bellar | G05D 1/228 |
| 11,953,334 | B2 * | 4/2024 | Lee | G06Q 50/40 |
| 12,001,998 | B2 * | 6/2024 | Park | G06Q 10/0834 |
| 12,002,300 | B2 * | 6/2024 | Son | H04W 4/48 |
| 12,016,061 | B2 * | 6/2024 | Fields | H04W 4/40 |
| 12,048,028 | B2 * | 7/2024 | Kennedy | H04W 76/19 |
| 12,069,749 | B2 * | 8/2024 | Kopchinsky | H04W 76/19 |
| 12,106,242 | B2 * | 10/2024 | Zhang | G06Q 10/06311 |
| 12,120,754 | B2 * | 10/2024 | Abella | H04W 12/06 |
| 12,141,740 | B2 * | 11/2024 | Ahmadi | G06Q 10/0838 |
| 12,200,783 | B2 * | 1/2025 | Kopchinsky | H04L 67/61 |
| 12,202,461 | B2 * | 1/2025 | Peterson | G05D 1/101 |
| 12,267,886 | B2 * | 4/2025 | Kopchinsky | G06Q 50/40 |
| 12,269,683 | B2 * | 4/2025 | Luckay | B65G 1/0492 |
| 12,299,610 | B2 * | 5/2025 | Cortese | G06Q 10/087 |
| 12,307,412 | B2 * | 5/2025 | Lisso | G06Q 10/0836 |
| 12,311,978 | B2 * | 5/2025 | Wu | G06K 7/10366 |
| 12,333,512 | B2 * | 6/2025 | Cella | B33Y 10/00 |
| 12,339,663 | B2 * | 6/2025 | Deng | G05D 1/0225 |
| 12,340,327 | B2 * | 6/2025 | Hanebeck | H04W 12/106 |
| 12,361,477 | B2 * | 7/2025 | Rajkhowa | G06F 9/54 |
| 12,471,153 | B2 * | 11/2025 | Kennedy | H04L 67/12 |
| 12,477,597 | B2 * | 11/2025 | Kennedy | H04W 4/44 |
| 12,482,356 | B2 * | 11/2025 | Fujita | G08G 1/127 |
| 2008/0167817 | A1 * | 7/2008 | Hessler | G01C 21/005<br>701/514 |
| 2019/0066041 | A1 | 2/2019 | Hance et al. | |
| 2019/0322319 | A1 * | 10/2019 | Smith | B60W 60/0025 |
| 2020/0090121 | A1 * | 3/2020 | Gupta | G06Q 10/087 |
| 2022/0073105 | A1 * | 3/2022 | Osawa | G06N 3/08 |

* cited by examiner

METHOD AND CONTROL UNIT FOR MANAGING LOADING AND/OR OFFLOADING OF A VEHICLE

TECHNICAL FIELD

The disclosure relates generally to a control unit and a computer-implemented method performed by the control unit. In particular aspects, the disclosure relates to managing loading and/or offloading of a vehicle. The disclosure can be applied in heavy-duty vehicles, such as trucks, buses, vessels, trains and construction equipment. Although the disclosure may be described with respect to a particular vehicle, the disclosure is not restricted to any particular vehicle.

BACKGROUND

Loading and/or offloading of vehicles at different locations takes place on a daily basis. For example, vessels are loaded and/or offloaded at a quay, trains are loaded and/or offloaded at a railway depot etc.

Taking loading and/or offloading of vessels at a quay as an example. Production plants and warehouses are often located close to a quay where loading and offloading of vessels such as a ship take place. It is important to provide a cost-effective loading and distribution process for the goods of the production plants and warehouses. There are various types of distribution channels such as bags, truck, and time-chartered bulk vessels that serve the production plants and warehouses.

There are large costs connected to a vessel laying at a quay and this brings high capital expenditures. Thus, every extra hour at the quay has an effect on the cost. In order to reduce the cost, keeping the time schedule for loading and/or offloading of the vessel is important. Typically, there is a time slot of 24 hours for loading and/or offloading the vessel.

Using loading of the vessel as an example. A typical loading or offloading process may be exemplified as follows, see also FIG. 1:

1) Bulk material is produced in a plant and stored in a warehouse 102.
2) A number of loading and/or offloading assets 105, e.g. wheel loaders, picks up the bulk material at the warehouse and transports it to the quay where the bulk material is loaded into a bucket. The bucket is typically located at the quay close to the vessel 101.
3) The bulk material is then loaded from the bucket and onto the vessel 101 using a conveyor belt 103.

A similar situation takes place at loading and/or offloading of trains at a railway depot or railway yard. Loading and/or offloading of trains at a railway depot is also time critical and it is a desire to meet the target departure time from the railway depot in order to reduce the cost for loading and/or offloading as much as possible.

Therefore, there is a strive to develop further improved technology relating to the managing loading and/or offloading of a vehicle, and there is a need to at least mitigate or solve this issue.

SUMMARY

According to a first aspect of the disclosure, there is provided a computer-implemented method for managing loading and/or offloading of a vehicle. The method comprises:

Obtaining, by the control unit, information indicating one or more of: which vehicle that is to be loaded and/or offloaded, a target time for vehicle departure from a location and a vehicle capacity;

initiating, by the control unit, loading and/or offloading of goods to and/or from the vehicle using one or more loading and/or offloading assets;

receiving, by the control unit and from the one or more loading and/or offloading assets, real-time information about an amount of goods that has been loaded and/or offloaded to and/or from the one or more loading and/or offloading assets;

determining, based on the real-time information, that the loading and/or offloading of the vehicle will be finished before, at or after the target time for vehicle departure; and when the loading and/or offloading will be finished before or after the target time, providing information indicating that the loading and/or offloading will be finished before or after the target time.

The first aspect of the disclosure may seek to improve managing loading and/or offloading of a vehicle. A technical benefit may include that managing loading and/or offloading of the vehicle is improved. With the information indicating that the loading and/or offloading will be finished after the target time, it may be possible to determine and initiate counter actions in order to ensure that it will be finished in time. With the information indicating that the loading and/or offloading will be finished before the target time, it may be possible to determine to add additional vehicles to the location's time schedule for a particular time period such that a higher number of vehicles are loaded and/or offloaded compared to the number of vehicles that was originally expected to be loaded and/or offloaded. The target time may comprise the hour and/or date for target departure. Thus, the capacity of the location may be increased.

In some examples, that the loading and/or offloading of the vehicle may be finished before, at or after the target time for vehicle departure may be determined based on historical loading and/or offloading information. A technical benefit of basing the decision on historical loading and/or offloading information may be that that the accuracy of the decision may be increased since more information is used as a basis for the decision, as compared to only using the real-time information. With the access to the historical loading and/or offloading information, the decision may be taken even in case the real-time information is received late or not received at all. In case the real-time information has some error or deviation that makes the information incorrect or unreliable, using historical loading and/or offloading information may counteract such error or deviation and the decision of that the loading and/or offloading will be finished before, at or after the target time will still be correct.

In some examples, that the loading and/or offloading of the vehicle may be finished before, at or after the target time for vehicle departure may be determined based vehicle capacity. A technical benefit may include that that the accuracy of the decision may be increased.

In some examples, that the loading and/or offloading of the vehicle may be finished before, at or after the target time for vehicle departure may be determined using Artificial Intelligence (AI) algorithms and/or self-learning models. A technical benefit may include that, with AI and self-learning models, it may be possible to ensure robust and accurate information about the loading and/or offloading.

In some examples, determining that the loading and/or offloading of the vehicle will be finished before, at or after the target time for vehicle departure may take into account that, for each time the loading and/or offloading asset picks up and/or delivers goods to and/or from the location, then the remaining goods to be picked up and/or delivered from the location is located further and further away from the vehicle or closer and closer to the vehicle such that travel distance of the loading and/or offloading asset changes for each time it picks up and/or delivers goods to and/or from the location. A technical benefit may include that the accuracy of the decision may be increased. Instead of a general assumption that the goods are located at the same place during the whole loading and/or offloading procedure such that the loading and/or offloading assets travel the same distance each time, more real-life and correct information is used in the decision, and this may increase the correctness and reliability of the decision.

In some examples, the real-time information about an amount of goods that has been loaded and/or offloaded to and/or from the one or more loading and/or offloading assets may be received from a goods measuring device comprised in each one or more loading and/or offloading assets. The goods measuring device may be for example a goods weighting device. A technical benefit may include that the accuracy of the decision may be increased. With a goods measuring device, e.g. a weight, a scale, an accurate measure of the actual amount of goods may be obtained. The loading and/or offloading assets may have various capacity in terms of volume and different types of goods may have different weight even though they have similar volume. Thus, the weight of the goods may be a more accurate measure as compared to e.g. volume.

In some examples, the information indicating that the loading and/or offloading will be finished before, at or after the target time may be provided to a display unit. A technical benefit may include that the information may be easily viewed and accessed by a user such as a foreman responsible for the loading and/or unloading at the location, e.g. a quay, a railway depot etc.

According to a second aspect of the disclosure, there is provided a control unit for managing loading and/or offloading of a vehicle. The control unit is arranged to perform a method according to the first aspect. Technical benefits of the second aspect are largely analogous to the technical benefits of the first aspects of the of the disclosure. It shall also be noted that all examples of the first aspects of the disclosure are combinable with all embodiments of the second aspect of the disclosure, and vice versa.

According to a third aspect of the disclosure, there is provided a vehicle comprising a control unit according to the second aspect. Technical benefits of the third aspect are largely analogous to the technical benefits of the first and second aspects of the of the disclosure. It shall also be noted that all examples of the first and second aspects of the disclosure are combinable with all embodiments of the third aspect of the disclosure, and vice versa.

According to a fourth aspect of the disclosure, there is provided a computer system comprising a processor device configured to perform the method of the first aspect. The processor device may be the control unit, or it may be comprised in the control unit of the second aspect. Technical benefits of the fourth aspect are largely analogous to the technical benefits of the first, second and third aspects of the of the disclosure. It shall also be noted that all examples of the first, second and third aspects of the disclosure are combinable with all embodiments of the fourth aspect of the disclosure, and vice versa.

According to a fifth aspect of the disclosure, there is provided a computer program product comprising program code for performing, when executed by a processor device, the method of the first aspect. Technical benefits of the fifth aspect are largely analogous to the technical benefits of the first, second, third and fourth aspects of the of the disclosure. It shall also be noted that all examples of the first, second, third and fourth aspects of the disclosure are combinable with all embodiments of the fifth aspect of the disclosure, and vice versa.

According to a sixth aspect of the disclosure, there is provided a non-transitory computer-readable storage medium comprising instructions, which when executed by a processor device, cause the processor device to perform the method of the first aspect. Technical benefits of the fifth aspect are largely analogous to the technical benefits of the first, second, third, fourth and fifth aspects of the of the disclosure. It shall also be noted that all examples of the first, second, third, fourth and fifth aspects of the disclosure are combinable with all embodiments of the sixth aspect of the disclosure, and vice versa.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

The drawings are not necessarily to scale, and the dimensions of certain features may have been exaggerated for the sake of clarity. Emphasis is instead placed upon illustrating the principle.

DETAILED DESCRIPTION

Aspects set forth below represent the necessary information to enable those skilled in the art to practice the disclosure.

As mentioned previously, it is important that loading and/or offloading of vehicles are on time and handled such that the time schedule is kept or at least kept with a lowest possible deviation. The cost for the loading and/or offloading needs to be kept as low as possible. Typically, there are several vehicles that needs to be loaded and/or offloaded at a location, and there may be a queue of vehicles waiting for their time slot and position and a free place at the location to be loaded and/or offloaded. If loading and/or offloading of one vehicle takes longer time than scheduled, then this effect the vehicles waiting for their turn for loading and/or offloading. Therefore, it is desirable to have a method for managing loading and/or offloading of a vehicle.

Consider an example where a vehicle such as a vessel has arrived at location such as a quay. A user, e.g. the foreman, creates a new mission for the vehicle in a control unit, e.g. a mobile phone, table computer or similar, associates the vehicle with the mission and by that the objective for the vehicle, the target date and target time of vehicle departure is also set. One or more loading and/or offloading assets starts to load and/or offload the vehicle, e.g. via a conveyor belt, and reports back to the control unit with information about real time tones loaded and/or offloaded. Based upon the historical loading history of the vehicle and the mix of loading and/or offloading assets and their capacity, AI and self-learning models may early in the process indicate if the loading and/or offloading will be finalized on time. If loading and/or offloading will not be finalized on time, information about this may be provided to a user, e.g. by displaying the information on a display, by audio output etc. The example is also applicable for a vehicle being a train and the location being a railway depot.

Figure 1:
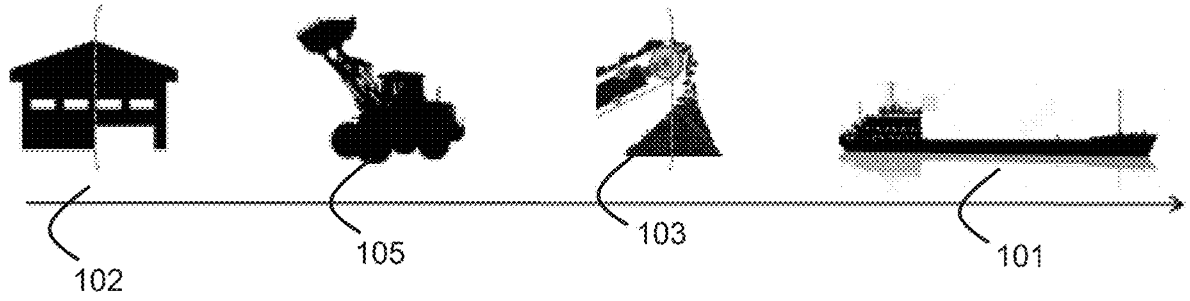
FIG. 1 is a schematic drawing illustrating loading and/or offloading of a vehicle according to one example.
Figure 2:
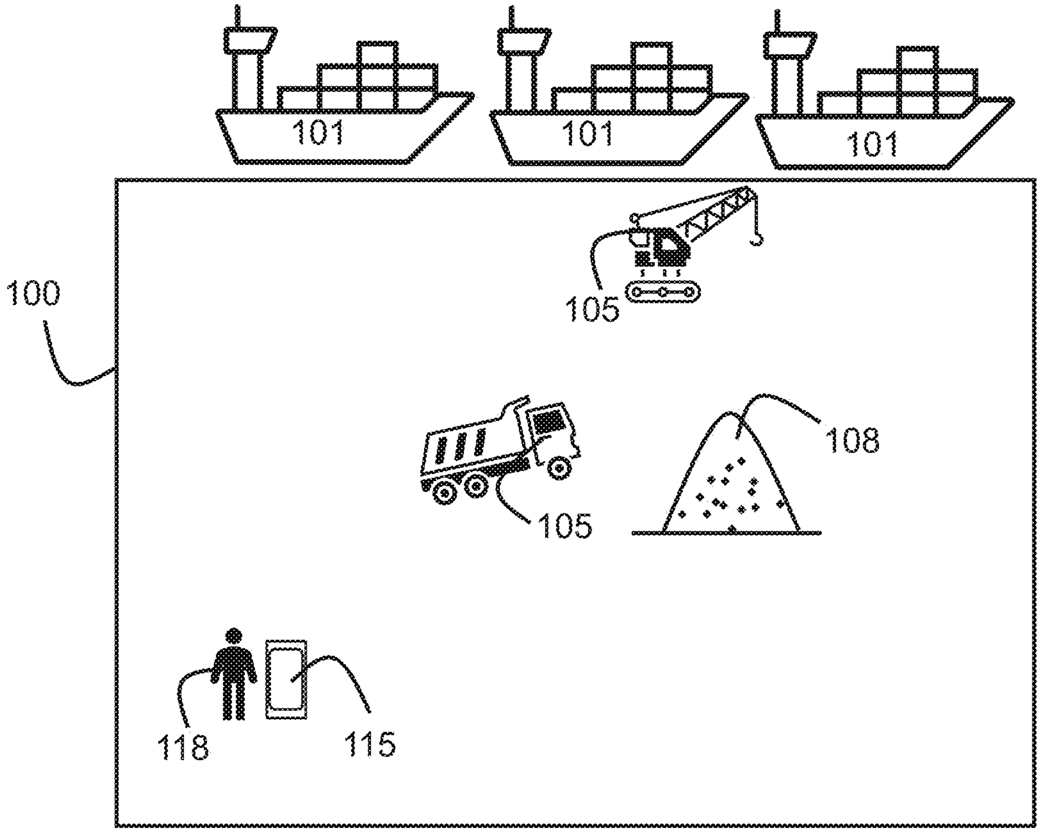
FIG. 2 is a schematic drawing illustrating loading and/or offloading of a vehicle according to one example.

FIG. 2 is a schematic drawing illustrating loading and/or offloading of a vehicle 101 according to one example. FIG. 2 illustrates a location 100, e.g. a quay, a railway depot etc. The location 100 may be a location at which the vehicle 101 is parked, moored, waiting in order to be loaded and/or offloaded. The vehicle 100 may be any suitable vehicle arranged for being loaded with goods 108, i.e. arranged for carrying goods 108 to be delivered to another location. At the location 100, here may be a need for synchronizing the loading and/or offloading speed with the load capacity of the vehicle 101 and the timetable or time schedule of the location 100.

One or more vehicles 101 are located at or in proximity of the location 100. FIG. 2 illustrates three vehicles 101, but any n number of vehicles 101 may be at the location 100, where n is a positive integer. A vehicle 101 may be referred to as a vessel, a ship, a boat, a train etc. The vehicle 101 may be arranged to be loaded with goods 108. The goods 108 may be any suitable type, for example bulk material, containers etc.

One or more loading and/or offloading assets 105 is exemplified in FIG. 2 to be located at the location 100. The term asset together with the reference number 105 may be used herein when referring to the loading and/or offloading asset 105 for the sake of simplicity. The assets 105 may be of the same or different types. Examples of types of assets 105 may be a truck, a crane, a dumper etc. There may be n number of assets 105 at the location 100, where n is a positive integer. The asset 105 may comprise a goods measuring device (not shown in FIG. 2). The gods measuring device may be arranged to measure the goods in terms of weight, volume, number of goods items etc.

The assets 105 are arranged to pick up and carry goods 108 from the location 100 and to be loaded on the vehicle 101, and/or to pick up and carry goods 108 offloaded from the vehicle 101 and further carried to the location 100 for storage or further handling.

A control unit 115 may be arranged to manage loading and/or offloading of a vehicle 101. The control unit 115 may comprise a display unit arranged for displaying information associated with the loading and/or offloading. The control unit 115 may be arranged to be used by a user 118, e.g. a foreman at the location 100, an operator of a vehicle 101 etc. The control unit 115 may be a handheld device or a stationary device, e.g. a mobile phone, a tablet computer, a stationary computer or any other suitable unit. The control unit 115 may be arranged to communicate with the vehicle 101, the assets 105 and other entities, devices etc. associated with the loading and/or offloading of the vehicle 101.

At the location, the user 118, e.g. the foreman, is responsible for managing loading and/or offloading of the vehicle 101. It is advantageous that user 118 has knowledge about an ongoing and real time status of the loading and/or offloading process in order to achieve optimum pace. The real time location optimization may disturb the user 118, e.g. provide information, when the control unit 115 indicates over capacity or when there is a risk not loading and/or offloading the vehicle 101 on time.

The loading and/or offloading asset 105 may be operated by an operator. It is advantageous that the operator obtains information if he's on track. As long as the foreman does not tell him to act differently, the operator knows that the production target is met, the vehicle 101 is loaded and/or offloaded close to max capacity. The operator may be a driver being located inside the asset 105, or the operator may be located at a distance from the asset 105, for example for an asset 105 being an at least partly autonomous asset.

Figure 3:
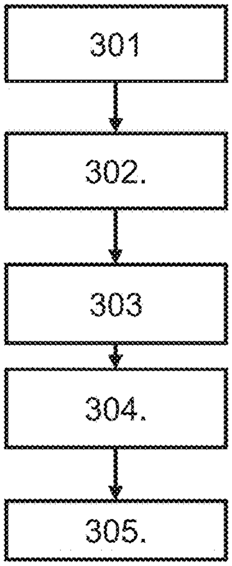
FIG. 3 is a flow chart illustrating a method according to one example.
Figure 6:
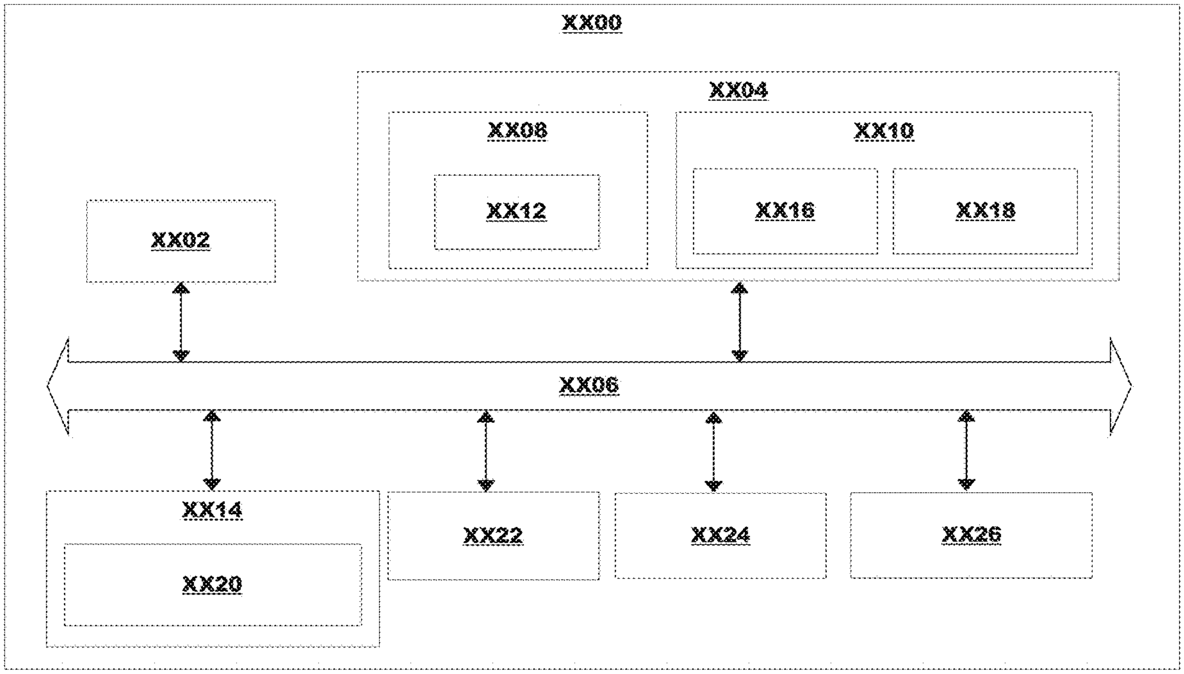
FIG. 6 is a schematic diagram of an exemplary computer system for implementing examples disclosed herein, according to one example.

The method for managing loading and/or offloading of a vehicle 101 will now be described with reference to the flowchart depicted in FIG. 3. The method is a computer-implemented method. The method may be performed by the control unit 115. The computer on which the method is implemented may be comprised in the control unit 115 or it may be the control unit 115. The computer on which the method is implemented may be the processor device XX02 as illustrated in FIG. 6 and which will be described in more detail later. FIG. 3 is a flow chart of a method managing loading and/or offloading of a vehicle 101 according to one example. The method comprises at least one of the following steps, which steps may as well be carried out in another suitable order than described below.

Step 301

The control unit 115 obtains information indicating one or more of: which vehicle 101 that is to be loaded and/or offloaded, a target time for vehicle arrival and/or departure from a location 100 and a vehicle capacity. The location 100 may be for example a quay, a railway depot etc. The vehicle 101 may be a vessel, a train, a ship, a boat etc.

The information indicating which vehicle 101 that is to be loaded and/or offloaded may comprise a vehicle ID. The information indicating which vehicle 101 that is to be loaded and/or offloaded may comprise vehicle type, where the vehicle type may be a vessel, a train, a ship, a boat etc.

The vehicle capacity may be for example a number of tons of material that the vehicle is arranged to carry. The vehicle capacity may be a vehicle loading capacity. The vehicle capacity may be measured in tonnes, in a number of containers, in volume etc.

The target time for vehicle arrival and/or departure may be predetermined. The information may comprise a timetable comprising arrival target times and departure arrival times for each vehicle 101 for the location 100.

The information may be obtained by the control unit 115 via user input, e.g. when the foreman inputs the information via the control unit 115.

The information may be obtained by the control unit 115 and from the vehicle 101 or from a vehicle control unit onboard the vehicle 100.

The information may be obtained by the control unit 115, not necessarily obtaining user input, requesting and receiving information from a database or memory unit, e.g. a database located at the location 100, a cloud database, a remotely located database, from another control unit comprised in the vehicle 101 etc.

The control unit 115 may be triggered to obtain the information in step 301 by receiving a trigger signal from the vehicle 101 or from another control unit onboard the vehicle 101. The trigger signal may be obtained when the vehicle 101 is within a distance to the location 100. The control unit 115 may detect that the vehicle 101 is within a distance and send a request for the information to the vehicle 101, or the vehicle 101 may automatically send the information to the control unit 115 when itself detects that it is within the distance to the control unit 115, not necessarily receiving a request from the control unit 115. The distance may be any suitable distance such as 10 meters from the location 100, between 10-0 meters from the location, at the location etc. The trigger signal may be obtained via a wired or wireless communication link between the control unit 115 and the vehicle 101.

Step 302

The control unit 115 initiates loading and/or offloading of goods 108 to and/or from the vehicle 101 using one or more loading and/or offloading assets 105.

The loading and/or offloading of goods 108 may be initiated by the control unit 115 by sending instructions to each loading and/or offloading assets 105 to start working, by sending instructions to a mobile phone, tablet computer or similar associated with the operator of each loading and/or offloading assets 105 etc. The loading and/or offloading of goods 108 may be initiated by the control unit 115 sending a start signal to each asset 105 which automatically starts performing the loading and/or offloading task. The start signal may be accompanied by, or it may comprise information about the task to be performed, for example which vessel that is to be loaded and/or offloaded, what type of goods it should carry etc. For example, if the assets 105 are at least partly autonomous vessels, then the assets 105 may start working when they receive the start signal from the control unit 115 without necessarily being operated by a driver or other operator.

Step 303

The control unit 115 receives real-time information about an amount of goods that has been loaded and/or offloaded to and/or from the one or more loading and/or offloading assets 105.

The real-time information about an amount of goods that has been loaded and/or offloaded to and/or from the one or more loading and/or offloading assets 105 may be received from for example a goods measuring device comprised in each one or more loading and/or offloading assets 105, from the one or more loading and/or offloading assets 105, from a memory storage, from a central server etc. The goods measuring device may be for example a loading weighing device. The amount of goods may be measured in a number of goods, a weight of the goods, a volume of the goods etc. The real-time information may comprise information about for example loading and/or offloading cycle times, distance between the goods and the vehicle etc.

The real-time information about the amount of goods may be requested by the control unit 115 prior to receiving it, or it may not necessarily send a request prior to receiving it.

The sender of the real-time information may be a unit that that measures the amount of goods that has been loaded and/or offloaded, or it may be a unit that is arranged to send the real-time information to the control unit 115 but not necessarily perform the measurement itself.

Step 304

The control unit 115 determines, based on the real-time information about the amount of goods that has been loaded and/or offloaded, that the loading and/or offloading of the vehicle 101 will be finished before, at or after the target time for vehicle departure. For example, the control unit 115 may compare the real-time information about the amount of goods that has been loaded and/or offloaded with a predicted amount of goods expected to be loaded and/or offloaded at the same time instance, or it may analyze the real-time information with respect to historical loading and/or offloading information.

That the loading and/or offloading of the vehicle 101 will be finished before, at or after the target time for vehicle departure may be determined based on historical loading and/or offloading information. The historical loading and/or offloading information may comprise historical production capacity for the assets 105, in addition to the loading capacity of the vehicle, of average loading capacity of the average vehicle that visits the location etc. The control unit 115 may use the historical loading and/or offloading information in the decision before the vehicle 101 arrives at the location 100 or when the vehicle 101 is a predetermined distance from the location 100. Before the vehicle 101 arrives at the location 100 or when the vehicle 101 is a predetermined distance from the location 100, the control unit 115 may keep track of historic loading and/or offloading information indicating time duration for loading and/or offloading of other vehicles at the location, the number of vessels 105 used in the loading and/or offloading of the other vehicles etc. When the vehicle 101 arrives at the location 100 or is closer than the predetermined distance from the location 100, the control unit 115 may gradually transition from using historical loading and/or offloading information to using real-time information, or to using both historical and real-time information, or to using only real-time information.

The historical loading and/or offloading information may be obtained from a local memory, e.g. comprised in the control unit 115, it may be obtained from an external memory, a cloud memory etc. The historic loading and/or offloading information may be for any suitable time period prior to the current day. The historic loading and/or offloading information may be obtained at a time instance earlier than the real-time information. The control unit 101 may compare the real-time information with the historical loading and/or offloading information to determine how the real-time loading and/or offloading is with respect to what has previously been performed and to determine if the loading and/or offloading of the vehicle 101 will be finished before, at or after the target time for vehicle departure. For example, if the historical loading and/or offloading information indicates that x tonnes of goods have been loaded after 2 hours, that y tonnes of goods have been loaded after 4 hours, then the real-time information may be compared with this in order to determine if the loading and/or offloading of the vehicle 101 will be finished before, at or after the target time for vehicle departure.

That the loading and/or offloading of the vehicle 101 will be finished before, at or after the target time for vehicle departure may be determined based on vehicle capacity. Vehicle capacity may be associated with a number of loading and/or offloading cycles that is possible per time unit, e.g. hour, and also the amount of goods the assets 105 may carry. Thus, control unit 115 may use information about the vehicle capacity, in addition to real-time information about the amount of goods to determine that the loading and/or offloading of the vehicle 101 will be finished before, at or after the target time for vehicle departure. The decision may be taken based on additional information, in addition to the vehicle capacity and the real-time information about the goods. The real-time information may be compared to the vehicle capacity in order to determine that the loading and/or offloading of the vehicle 101 will be finished before, at or after the target time for vehicle departure.

That the loading and/or offloading of the vehicle 101 will be finished before, at or after the target time for vehicle departure may be determined using AI algorithms and/or self-learning models. The AI algorithms and/or self-learning models may take at least one of the real-time information about the amount of goods, the historic loading and/or offloading information and the vehicle capacity into account, and these parameters may be input data to the AI algorithms and/or self-learning models.

AI algorithms and/or self-learning models may comprise capabilities that train the control unit 115 to monitor the production process ensuring the vehicle 101 to be loaded and/or offloaded on time.

The AI algorithms and/or self-learning models may use one or more of the following input data:

- Vehicle data, e.g. name and capacity of the vehicle 101, and schedule data, e.g. date and time for departure. Capacity is a production goal for the location 100 to strive for and date/time for departure gives how many hours the process, e.g. a number of assets 105, has left until the vehicle 101 departs.
- Machine data, e.g. data from the assets 105 such as timestamp, GPS position, weight and machine ID The control unit 115 may start to train its AI algorithms and/or self-learning models by using the timestamp and positioning to determine the time for each loading and/or offloading cycle that in combination with the payload of each load and/or offload will give the AI algorithms and/or self-learning models an indication of the loading and/or offloading capacity per hour each asset 105 have. The AI algorithms and/or self-learning models may then use the target vehicle capacity to calculate if the loading and/or offloading capacity is enough to meet the vehicle departure time. To do this the AI algorithms and/or self-learning models may compile all assets 105 that shares the same mission into a, not asset, but a production process to give the control unit 115 and possibly also the user 118 a full picture of the operation. Positioning may give the AI algorithms and/or self-learning models robustness, especially in the beginning of the loading and/or offloading process, distance may help the AI algorithms and/or self-learning models at an early stage to estimate time of the loading and/or offloading cycle.

Positioning may see to that only loads that are targeting the vehicle 101 will be counted.

Positioning may indicate if the loading spot changes, by that the AI algorithms and/or self-learning models reacts on that indicating longer cycle times that affects time when vehicle 101 is ready for departure from the location 100.

Positioning may enable the AI algorithms and/or self-learning models to separate several loading and/or offloading assets 105 sharing the mission loading and/or offloading the vehicle 101 but with different loading and/or offloading patterns and different cycle times, The AI algorithms and/or self-learning models may also be trained to indicate and highlight when the process is getting into a critical state not reaching the target, a vehicle 101 not loaded and/or offloaded on time.

The determining of that the loading and/or offloading of the vehicle 101 will be finished before, at or after the target time for vehicle departure may take into account that, for each time the asset 105 picks up and/or delivers goods 108 to and/or from the location 100, then the remaining goods 108 to be picked up and/or delivered from the location 100 may be located further and further away from the vehicle 101 or closer to the vehicle 101 such that travel distance of the asset 105 may change for each time it picks up and/or delivers goods 108 to and/or from the location 100. For example, if the goods 108 comprises bulk material, e.g. sand, gravel etc., then it is typically stored as a stockpile at the location 100, e.g. the quay, the railway depot etc. For loading of the bulk material on the vehicle 101, the stockpile at the location 100 will become smaller and smaller as more and more bulk material is loaded onto the vehicle 101. Consequently the distance that the asset 105 travels during the loading will change as the stockpile size is reduced.

Step 305

When the loading and/or offloading will be finished before or after the target time, the control unit 115 provides information indicating that the loading and/or offloading will be finished before or after the target time.

Figure 4:
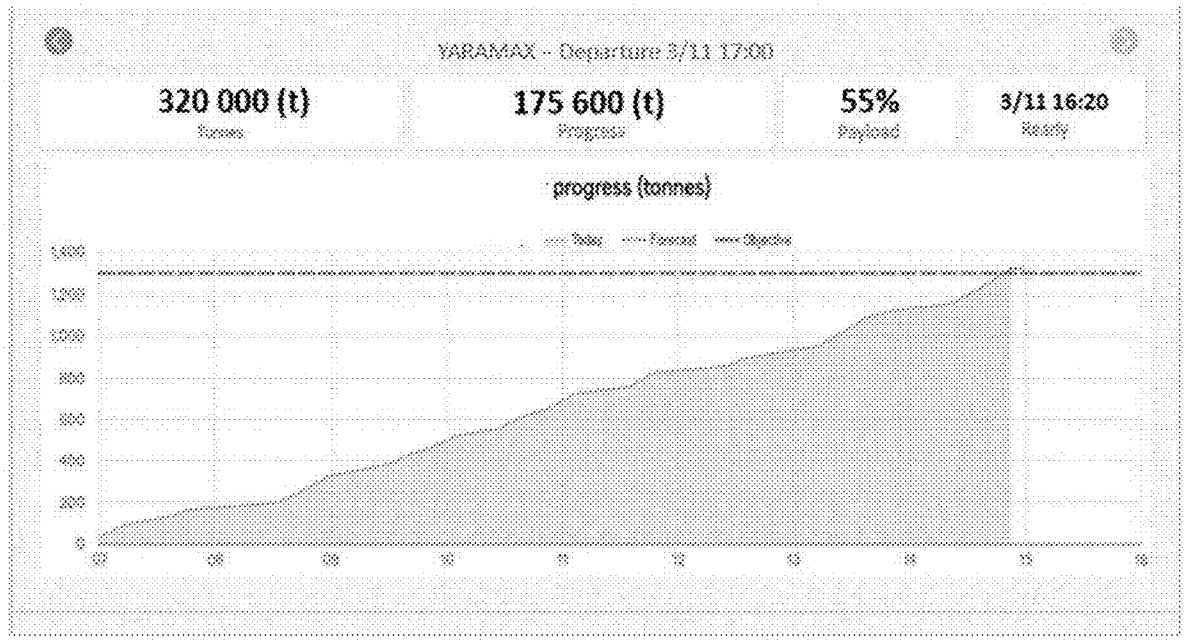
FIG. 4 is a schematic drawing illustrating information displayed on a display unit according to one example.

The information indicating that the loading and/or offloading will be finished before, at or after the target time may be provided to a display unit 115. FIG. 4 is a schematic drawing illustrating the information that may be provided to the display unit 115 and which may consequently be displayed on the display unit 115 to be viewed by the user 118. FIG. 4 illustrates tons, i.e. the vehicle capacity, which may be the objective to challenge. In FIG. 4, the tonnes is exemplified to be 320 000. FIG. 4 illustrates the progress, i.e. real time achievements, which is exemplified to be 775 600 in FIG. 4. FIG. 4 illustrates payload, i.e. the work is 55% finished. FIG. 4 illustrates ready, e.g. the vehicle 101 is ready 3/11 16:20 indicating that planned departure for vehicle YARAMAX 3/11 17:00 is realistic. The information in FIG. 4 may comprise a graph illustrating the loading and/or offloading process, in tonnes, for the location 100. The dotted horizontal line illustrates the objective for the location 100.

The control unit 115 may be arranged to provide information indicating statistics on one or more of the following:

- Knowing time of loading the specific vehicles 101 with different mixes of assets 105.
- Provide a preliminary calculation tool that may indicate how much faster loading and/or offloading a specific vehicle 101 with X increased loading and/or offloading capacity.
- Know optimum loading and/or offloading capacity to load and/or offload vehicles 101 of different sizes; loading and/or offloading time in relation to shifts and working time.

Suitable actions may be initiated when it is determined that the loading and/or offloading will be finished after the target time. The actions may be for example determining that additional assets 105 is to participate in the loading and/or offloading of the vehicle 101. It may be determined which type of additional loading and/or offloading assets 105 that is needed in order to meet the target time, which loading capacity the additional assets 105 needs to have in order to meet the target time etc. Another action may be for example to initiate rearranging of the timetable for the vehicles 101 waiting to be loaded and/or offloaded at the location.

When it is determined that the loading and/or offloading will be finished before the target time, then the control unit 115 and/or the user 118 of the control unit 115 may determine to initiate rearranging of the timetable for the vehicles 101 waiting to be loaded and/or offloaded at the location. Finishing before the target time involves that the vehicle 101 may depart from the location 100 at an earlier time than planned. The time that the vehicle 101 spends at the location 100 is involved with a cost per hour, and this cost may be reduced if the vehicle 101 may depart at an earlier time than the target time. It may also involve that more vehicles 101 may be able to be loaded and/or offloaded at the location 100 than originally planned. Thus, the efficiency of the loading and/or offloading at the location 100 is improved.

A control unit 115 is arranged managing loading and/or offloading of a vehicle 101. The control unit 115 is arranged to perform a method as described herein.

A vehicle 101 may comprise the control unit 115.

Instead of the control unit 115 being comprised in the vehicle 100, the control unit 115 may be comprised in the loading and/or offloading asset 105.

The control unit 115 may be a standalone unit not comprised in a vehicle 101 or in a loading and/or offloading asset 105 but arranged to communicate with a vehicle 101 and/or a loading and/or offloading asset 105.

A computer system comprises a processor device configured to perform the method described herein. The computer system will be described in more detail later.

A computer program product comprises program code for performing, when executed by a processor device, the method described herein.

A non-transitory computer-readable storage medium comprises instructions, which when executed by a processor device, cause the processor device to perform the method described herein.

The present mechanism for managing loading and/or offloading of a vehicle 101 may be implemented through one or more processors, such as a processor in the control unit 115, together with computer program code for performing the functions described herein. The processor may be a processor device. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the present disclosure herein when being loaded into the control unit 115. One such carrier may be in the form of a CD ROM disc. It is however feasible with other data carriers such as a memory stick. The computer program code can be provided as pure program code on a server and downloaded to the control unit 115.

Figure 5A:
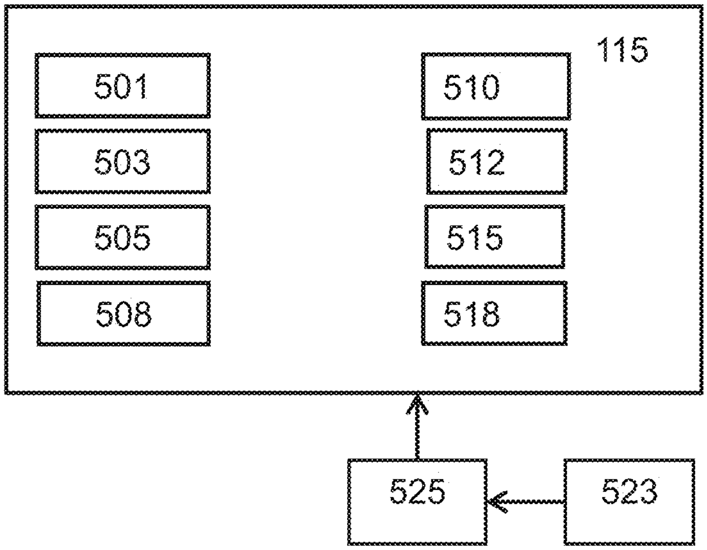
FIG. 5*a* is a schematic drawing illustrating a control unit according to one example.
Figure 5B:
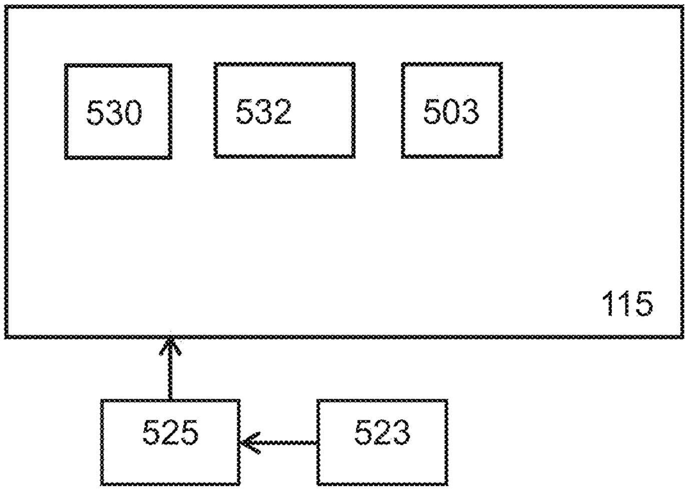
FIG. 5*b* is a schematic drawing illustrating a control unit according to one example.

To perform the method steps shown in FIG. 3 for managing loading and/or offloading of a vehicle 101, the control unit 115 may comprise an arrangement as shown in FIG. 5*a* and/or FIG. 5*b*. FIG. 5*a* and FIG. 5*b* depict two different examples in panels a) and b), respectively, of the arrangement that the control unit 115 may comprise.

The present disclosure related to the control unit 115 may be implemented through one or more processors, such as a processor 501 in the control unit 115 depicted in FIG. 5*a*, together with computer program code for performing the functions and actions described herein. A processor, as used herein, may be understood to be a hardware component. The program code mentioned above may also be provided as a computer program product, for instance in the form of a data carrier carrying computer program code for performing the present disclosure when being loaded into the control unit 115. One such carrier may be in the form of a CD ROM disc. It is however feasible with other data carriers such as a memory stick. The computer program code may be provided as pure program code on a server and downloaded to the control unit 115.

The control unit 115 may comprise a memory 503 comprising one or more memory units. The memory 503 is arranged to be used to store obtained information, store data, configurations, schedulings, and applications etc. to perform the methods herein when being executed in the control unit 115.

The control unit 115 may receive information through a receiving port 505. The receiving port 505 may be, for example, connected to one or more antennas in control unit 115. The control unit 115 may receive information from another structure through the receiving port 505. Since the receiving port 505 may be in communication with the processor 501, the receiving port 505 may then send the received information to the processor 501. The receiving port 505 may also be configured to receive other information.

The processor 501 in the control unit 115 may be configured to transmit or send information to another structure, through a sending port 508, which may be in communication with the processor 501, and the memory 503.

The control unit 115 is arranged to, e.g. by means of an obtaining module 510, obtain information indicating one or more of: which vehicle 101 that is to be loaded and/or offloaded, a target time for vehicle departure from a location 100 and a vehicle capacity.

The obtaining module 510 may also be referred to as an obtaining unit, an obtaining means, an obtaining circuit, means for obtaining etc. The obtaining module 501 may be a processor 501 of the control unit 115 or comprised in the processor 501 of the control unit 115.

The control unit 115 is arranged to, e.g. by means of an initiating module 513, initiating loading and/or offloading of goods 108 to and/or from the vehicle 101 using one or more loading and/or offloading assets 105. The initiating module 513 may also be referred to as an initiating unit, an initiating means, an initiating circuit, means for initiating etc. The initiating module 513 may be a processor 501 of the control unit 115 or comprised in the processor 501 of the control unit 115.

The control unit 115 is arranged to, e.g. by means of a receiving module 515, receiving real-time information about an amount of goods that has been loaded and/or offloaded to and/or from the one or more loading and/or offloading assets 105. first receiving module 515 may also be referred to as a receiving unit, a receiving means, a receiving circuit, first means for receiving, input unit etc. The receiving module 515 may be a receiver, a transceiver etc. The receiving module 515 may be a wireless receiver of the control unit 115.

The real-time information about an amount of goods that has been loaded and/or offloaded to and/or from the one or more loading and/or offloading assets 105 may be the weight of the goods, the volume of goods, a number of goods items etc. Information about the amount of goods may be obtained from for example a goods measuring device comprised in each one or more loading and/or offloading assets 105 or associated with the assets 105 in some other suitable way. For example, the assets 105 may drive over a goods measuring device located at some suitable place at the location, for example a weight build into the ground. The assets 105 may have a goods measuring device located onboard the asset at any suitable location arranged for obtaining information about the goods etc. The goods measuring device may be a weight, a scale, an optical device etc. The goods measuring device may be an analogue device or digital device. The goods measuring device may be arranged to obtain information about the weight, e.g. measured in tonnes, volume, number of goods items etc. The information about the goods may be obtained from an optical device, e.g. a camera, which is arranged to visually monitor and capture images of the goods. The captured images may provide information, e.g. visual information, about the increase and/or decrease of amount of goods that has been loaded and/or offloaded from the assets 105, e.g. is may visually illustrate the dimension change, e.g. height and/or width change, of the goods during the loading and/or offloading process. Information from the optical device and a goods parameter such as the density of the goods may together provide information about the goods, e.g. the weight in tonnes.

The control unit 115 is arranged to, e.g. by means of a determining module 518, determine, based on the real-time information, that the loading and/or offloading of the vehicle 101 will be finished before, at or after the target time for vehicle departure. The determining module 518 may also be referred to as a determining unit, a determining means, a determining circuit, means for determining etc. The determining module 518 may be a processor 501 of the control unit 115 or comprised in the processor 501 of the control unit 115.

That the loading and/or offloading of the vehicle 101 will be finished before, at or after the target time for vehicle departure may be determined based on historical loading and/or offloading information.

That the loading and/or offloading of the vehicle 101 will be finished before, at or after the target time for vehicle departure may be determined based on vehicle capacity.

That the loading and/or offloading of the vehicle 101 will be finished before, at or after the target time for vehicle departure may be determined using AI algorithms and/or self-learning models.

Determining that the loading and/or offloading of the vehicle 101 will be finished before, at or after the target time for vehicle departure may take into account that, for each time the loading and/or offloading asset 105 picks up and/or delivers goods 108 to and/or from the location 100, then the remaining goods 108 to be picked up and/or delivered from the location 100 is located further and further away from the vehicle 101 or closer to the vehicle 101 such that travel distance of the loading and/or offloading asset 105 changes for each time it picks up and/or delivers goods 108 to and/or from the location 100.

The control unit 115 is arranged to, e.g. by means of a providing module 520, when the loading and/or offloading will be finished before or after the target time, provide information indicating that the loading and/or offloading will be finished before or after the target time. The providing module 520 may also be referred to as a providing unit, a providing means, a providing circuit, means for providing etc. The providing module 518 may be a processor 501 of the control unit 115 or comprised in the processor 501 of the control unit 115. The providing module 520 may be a transmitting module.

The information indicating that the loading and/or offloading will be finished before, at or after the target time may be provided to a display unit 115.

The control unit 115 may comprise the obtaining module 510, the initiating module 513, the receiving module 515, the determining module 518, the providing module 520 and other module(s) 522 etc.

Those skilled in the art will also appreciate that the obtaining module 510 an initiating module 513, a receiving module 515, a determining module 518, a providing module 520 and other module(s) 522 etc. described above may refer to a combination of analogue and digital circuits, and/or one or more processors configured with software and/or firmware, e.g., stored in memory, that, when executed by the one or more processors such as the processor 501, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

The different units 510-522 described above may be implemented as one or more applications running on one or more processors such as the processor 501.

Thus, the methods described herein for the control unit 115 may be respectively implemented by means of a computer program 523 product, comprising instructions, i.e., software code portions, which, when executed on at least one processor 501, cause the at least one processor 501 to carry out the actions described herein, as performed by the control unit 115. The computer program 523 product may be stored on a computer-readable storage medium 525. The computer-readable storage medium 525, having stored thereon the computer program 523, may comprise instructions which, when executed on at least one processor 501, cause the at least one processor 501 to carry out the actions described herein, as performed by the control unit 115. The computer-readable storage medium 525 may be a non-transitory computer-readable storage medium, such as a CD ROM disc, or a memory stick. The computer program 523 product may be stored on a carrier containing the computer program 523 just described, wherein the carrier is one of an electronic signal, optical signal, radio signal, or the first computer-readable storage medium 508, as described above.

The control unit 115 may comprise a communication interface configured to facilitate communications between the control unit 115 and other units or devices, or another structure. The interface may comprise a transceiver configured to transmit and receive radio signals over an air interface in accordance with a suitable standard.

The control unit 115 may comprise the following arrangement depicted in FIG. 5*b*. The control unit 115 may comprise a processing circuitry 530, e.g., one or more processors such as the processor 501, in the control unit 115 and the memory 503. The control unit 115 may also comprise a radio circuitry 532, which may comprise e.g., the receiving port 505 and the sending port 508. The processing circuitry 530 may be configured to, or operable to, perform the method actions according to FIG. 3, in a similar manner as that described in relation to FIG. 5*a*. The radio circuitry 532 may be configured to set up and maintain at least a wireless connection with the control unit 115. Circuitry may be understood herein as a hardware component.

The control unit 115 may comprise the processing circuitry 530 and the memory 503. The memory 503 comprises instructions executable by the processing circuitry 530. The control unit 115 is operative to perform the actions described herein in relation to the control unit 115, e.g., in FIG. 3.

FIG. 6 is a schematic diagram of a computer system XX00 for implementing examples disclosed herein. The computer system XX00 is adapted to execute instructions from a computer-readable medium to perform these and/or any of the functions or processing described herein. The computer system XX00 may be connected (e.g., networked) to other machines in a LAN, an intranet, an extranet, or the Internet. While only a single device is illustrated, the computer system XX00 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc. The computer system XX00 may comprise at least one computing device or electronic device capable of including firmware, hardware, and/or executing software instructions to implement the functionality described herein. The computer system XX00 may include a processor device XX02, which may also be referred to as a control unit, a memory XX04, and a system bus XX06. The computer system XX00 may include at least one computing device having the processor device XX02. The system bus XX06 provides an interface for system components including, but not limited to, the memory XX04 and the processor device XX02. The processor device XX02 may include any number of hardware components for conducting data or signal processing or for executing computer code stored in memory XX04. The processor device XX02, e.g., control unit, may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus XX06 may be any of several types of bus structures that may further interconnect to a memory bus, with or without a memory controller, a peripheral bus, and/or a local bus using any of a variety of bus architectures. The memory XX04 may be one or more devices for storing data and/or computer code for completing or facilitating methods described herein. The memory XX04 may include database components, object code components, script components, or other types of information structure for supporting the various activities herein. Any distributed or local memory device may be utilized with the systems and methods of this description. The memory XX04 may be communicably connected to the processor device XX02, e.g., via a circuit or any other wired, wireless, or network connection, and may include computer code for executing one or more processes described herein. The memory XX04 may include non-volatile memory XX08 (e.g., read-only memory (ROM), erasable programmable read-only memory (EPROM), electrically erasable programmable read-only memory (EEPROM), etc.), and volatile memory XX10, e.g., random-access memory (RAM), or any other medium which can be used to carry or store desired program code in the form of machine-executable instructions or data structures, and which can be accessed by a computer or other machine with a processor device XX02. A basic input/output system (BIOS) XX12 may be stored in the non-volatile memory XX08 and can include the basic routines that help to transfer information between elements within the computer system XX00.

The computer system XX00 may further include or be coupled to a non-transitory computer-readable storage medium such as the storage device XX14, which may comprise, for example, an internal or external hard disk drive (HDD) (e.g., enhanced integrated drive electronics (EIDE) or serial advanced technology attachment (SATA)), HDD, e.g., EIDE or SATA, for storage, flash memory, or the like. The storage device XX14 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device XX14 and/or in the volatile memory XX10, which may include an operating system XX16 and/or one or more program modules XX18. All or a portion of the examples disclosed herein may be implemented as a computer program product XX20 stored on a transitory or non-transitory computer-usable or computer-readable storage medium, e.g., single medium or multiple media, such as the storage device XX14, which includes complex programming instructions, e.g., complex computer-readable program code, to cause the processor device XX02 to carry out the steps described herein. Thus, the computer-readable program code can comprise software instructions for implementing the functionality of the examples described herein when executed by the processor device XX02. The processor device XX02 may serve as a controller or control system for the computer system XX00 that is to implement the functionality described herein.

The computer system XX00 also may include an input device interface XX22, e.g., input device interface and/or output device interface. The input device interface XX22 may be configured to receive input and selections to be communicated to the computer system XX00 when executing instructions, such as from a keyboard, mouse, touch-sensitive surface, etc. Such input devices may be connected to the processor device XX02 through the input device interface XX22 coupled to the system bus XX06 but can be connected through other interfaces such as a parallel port, an Institute of Electrical and Electronic Engineers (IEEE) 1394 serial port, a Universal Serial Bus (USB) port, an IR interface, and the like. The computer system XX00 may include an output device interface XX24 configured to forward output, such as to a display, a video display unit, e.g., a liquid crystal display (LCD) or a cathode ray tube (CRT). The computer system XX00 may also include a communications interface XX26 suitable for communicating with a network as appropriate or desired.

Summarized, the present disclosure comprises a management method, a traffic control method or warning method that will provide warnings if loading and/or offloading the vehicle 101 is not managed on time. Today there is no such method. The loading and/or offloading operation at a location is based upon experience and there is need for over capacity not to jeopardize a fully loaded vehicle.

The present disclosure is related to managing of loading and/or offloading of a vehicle 100. The vehicle 100 may be any suitable vehicle arranged for being loaded with goods 108, i.e. arranged for carrying goods 108. The vehicle 100 may be for example a vessel, a train etc. The present disclosure is applicable to a location 100 where there is a need for synchronizing loading and/or offloading speed with the load capacity of the vehicle 101 and the timetable or time schedule of the location 100.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer-implemented method performed by a control unit for managing loading and/or offloading of a vehicle, the method comprising:

obtaining, by the control unit information indicating one or more of: which vehicle that is to be loaded and/or offloaded, a target time for vehicle departure from a location and a vehicle capacity;

initiating, by the control unit loading and/or offloading of goods to and/or from the vehicle using one or more loading and/or offloading assets;

receiving, by the control unit real-time information about an amount of goods that has been loaded and/or offloaded to and/or from the one or more loading and/or offloading assets;

determining, by the control unit, based on the real-time information, that the loading and/or offloading of the vehicle will be finished before, at or after the target time for vehicle departure; and when the loading and/or offloading will be finished before or after the target time, providing, by the control unit, information indicating that the loading and/or offloading will be finished before or after the target time, wherein determining that the loading and/or offloading of the vehicle will be finished before, at or after the target time for vehicle departure is based on, for each time the loading and/or offloading asset picks up and/or delivers goods to and/or from the location, then the remaining goods to be picked up and/or delivered from the location is located further and further away from the vehicle or closer to the vehicle such that travel distance of the loading and/or offloading asset changes for each time it picks up and/or delivers goods to and/or from the location;

in response to determining that the loading and/or offloading will not be finished before the target time, automatically initiating, by the control unit, at least one of the counter-actions selected from:

(i) transmitting instructions to additional loading and/or offloading assets to participate in the loading and/or offloading of the vehicle, (ii) reallocating tasks among the loading and/or offloading assets, (iii) adjusting operational parameters of the loading and/or offloading assets, and (iv) modifying a timetable for vehicles waiting to be loaded and/or offloaded at the location, wherein the control unit transmits control signals to the loading and/or offloading assets to implement the initiated counter-actions.

2. The method according to claim 1, wherein that the loading and/or offloading of the vehicle will be finished before, at or after the target time for vehicle departure is determined based on historical loading and/or offloading information.

3. The method according to claim 1, wherein that the loading and/or offloading of the vehicle will be finished before, at or after the target time for vehicle departure is determined based on vehicle capacity.

4. The method according to claim 1, wherein that the loading and/or offloading of the vehicle will be finished before, at or after the target time for vehicle departure is determined using Artificial Intelligence algorithms and/or self-learning models.

5. The method according to claim 1, wherein the real-time information about an amount of goods that has been loaded and/or offloaded to and/or from the one or more loading and/or offloading assets is received from a goods measuring device comprised in each one or more loading and/or offloading assets.

6. The method according to claim 1, wherein the information indicating that the loading and/or offloading will be finished before, at or after the target time is provided to a display unit.

7. A control unit for managing loading and/or offloading of a vehicle, wherein the control unit is arranged to perform a method according to claim 1.

8. A vehicle comprising a control unit according to claim 7.

9. A computer system comprising a processor device configured to perform the method of claim 1.

10. A non-transitory computer-readable storage medium comprising instructions, which when executed by a processor device, cause the processor device to perform the method of claim 1.

* * * * *